US010419396B2

(12) United States Patent
Bangalore Krishnamurthy

(10) Patent No.: US 10,419,396 B2
(45) Date of Patent: Sep. 17, 2019

(54) DEEP PACKET INSPECTION WITH ENHANCED DATA PACKET ANALYZERS

(71) Applicant: NICIRA, INC., Palo Alto, CA (US)

(72) Inventor: Sudheendra Bangalore Krishnamurthy, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 118 days.

(21) Appl. No.: 15/479,306

(22) Filed: Apr. 5, 2017

(65) Prior Publication Data

US 2018/0183756 A1 Jun. 28, 2018

(30) Foreign Application Priority Data

Dec. 22, 2016 (IN) .............................. 201641043877

(51) Int. Cl.
*H04L 29/06* (2006.01)
*H04L 12/26* (2006.01)
(52) U.S. Cl.
CPC .......... *H04L 63/0227* (2013.01); *H04L 43/12* (2013.01); *H04L 63/1416* (2013.01); *H04L 63/1408* (2013.01)
(58) Field of Classification Search
CPC ... H04L 63/123; H04L 63/14; H04L 63/0227; H04L 63/1416; H04L 63/1425; H04L 43/18; H04L 47/32

USPC .......... 726/11–15, 22–23; 713/150, 153–154
See application file for complete search history.

(56) References Cited

U.S. PATENT DOCUMENTS

| | | | | |
|---|---|---|---|---|
| 8,116,312 | B2* | 2/2012 | Riddoch | H04L 49/90 370/389 |
| 8,413,241 | B2* | 4/2013 | Weeks | G06F 21/55 370/252 |
| 8,443,440 | B2* | 5/2013 | McGee | G06F 21/51 709/204 |
| 8,705,395 | B2* | 4/2014 | Scott | H04L 43/106 370/252 |
| 9,059,965 | B2* | 6/2015 | Droux | H04L 63/0227 |
| 9,165,140 | B2* | 10/2015 | McGee | G06F 21/51 |

* cited by examiner

*Primary Examiner* — Hosuk Song

(57) ABSTRACT

Examples provide a deep packet inspection for performing security operations on network data packets by a plurality of enhanced packet analyzers. A copy of a mirrored network data packet is sent to each of the packet analyzers. Each packet analyzer performs one or more security operations on the copy in parallel, and generates an allow recommendation or a deny recommendation. If all the recommendations are allow recommendations, a virtual network interface controller (VNIC) routes the network data packet to its destination. If at least one of the recommendations is a deny recommendation, the VNIC discards the network data packet.

20 Claims, 8 Drawing Sheets

DEEP PACKET INSPECTION WITH ENHANCED DATA PACKET ANALYZERS

RELATED APPLICATIONS

Benefit is claimed under 35 U.S.C. 119(a)-(d) to Foreign Application Serial No. 201641043877 filed in India entitled "DEEP PACKET INSPECTION WITH ENHANCED DATA PACKET ANALYZERS", on Dec. 22, 2016, by NICIRA, INC., which is herein incorporated in its entirety by reference for all purposes.

BACKGROUND

A network enables the exchange of information between computing devices. A physical network includes hardware adapters, routers, switches, cabling, modems, or other hardware for forwarding data packets via physical network architecture. Of course, any of these physical devices may be implemented on commodity central processing unit (CPU) devices with software. A logical overlay network is a network abstraction that is decoupled from the underlying physical infrastructure and can include logical network components, such as, but not limited to, logical switches, routers, firewalls, load balancers, virtual network adapters, and/or logical ports. Virtual computing instances (VCI), such as virtual machines and namespace based containers, running on a host cluster share physical computing resources, as well as network resource access. This enables improved efficiency and flexibility in provisioning network resources within the host cluster.

Firewalls control input, output, and access to and from applications and/or services. Firewalls monitor and block input and output in accordance with configuration policies or that otherwise indicate intrusions, malformed communications, or other undesirable communications. However, current virtual network firewalls provide level four transport layer firewall capabilities, level three network layer security capabilities, and level two data link layer security. These services can be provided in physical devices, which can function with very high throughput performance using specialized application specific integrated circuit (ASIC) processors. However, such physical devices can only operate on the physical network layer, not the logical overlay network because the network packets operated on by these devices are encapsulated and potentially encrypted. Virtual network appliances written for general purpose CPUs can operate on or in a hypervisor, and therefore, secure the logical overlay network, but generally not at the levels of performance expected of hardware network appliances.

SUMMARY

Examples of the disclosure provide for performing security operations associated with network traffic. A plurality of packet analyzers receives copies of a mirrored network data packet. Each packet analyzer in the plurality of packet analyzers receives a copy of the mirrored network data packet from a mirror feeder. Security operations are performed on the received copies of the mirrored network data packet by each packet analyzer in parallel. A recommendation for the network data packet is generated by each packet analyzer. The recommendation comprising an allow recommendation or a deny recommendation. The output recommendation from each packet analyzer is sent to a virtual network interface controller (VNIC). The VNIC discards a network data packet or allows the network data packet based on the output recommendations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure include a deep packet inspection engine of network traffic at a virtual network interface controller (VNIC) level. A VNIC may also be referred to as a virtual network interface card or a virtual network adapter.

The deep packet inspection de-capsulates received port mirrored network traffic to provide input for various enhanced security feature packet analyzers. This provides improved security to logical overlay networks. Control logic processes the outputs from various packet analyzers and determines whether to allow or deny network data packets at a policy enforcement point. These features provide greater data transmission security and more efficient network data packet inspection.

In still other examples, a plurality of packet analyzers is provided for performing security operations at the VNIC level. By providing the security features directly at the VNIC level, the deep packet inspection engine provides enhanced security features with special-purpose plug-ins and without relying on multiple, third party vendor appliances.

While some embodiments are described with reference to VMs for clarity of description, the disclosure is operable with other forms of VCIs. A VCI may be a VM, a container, and/or any other type of virtualized computing instance.

Figure 1:
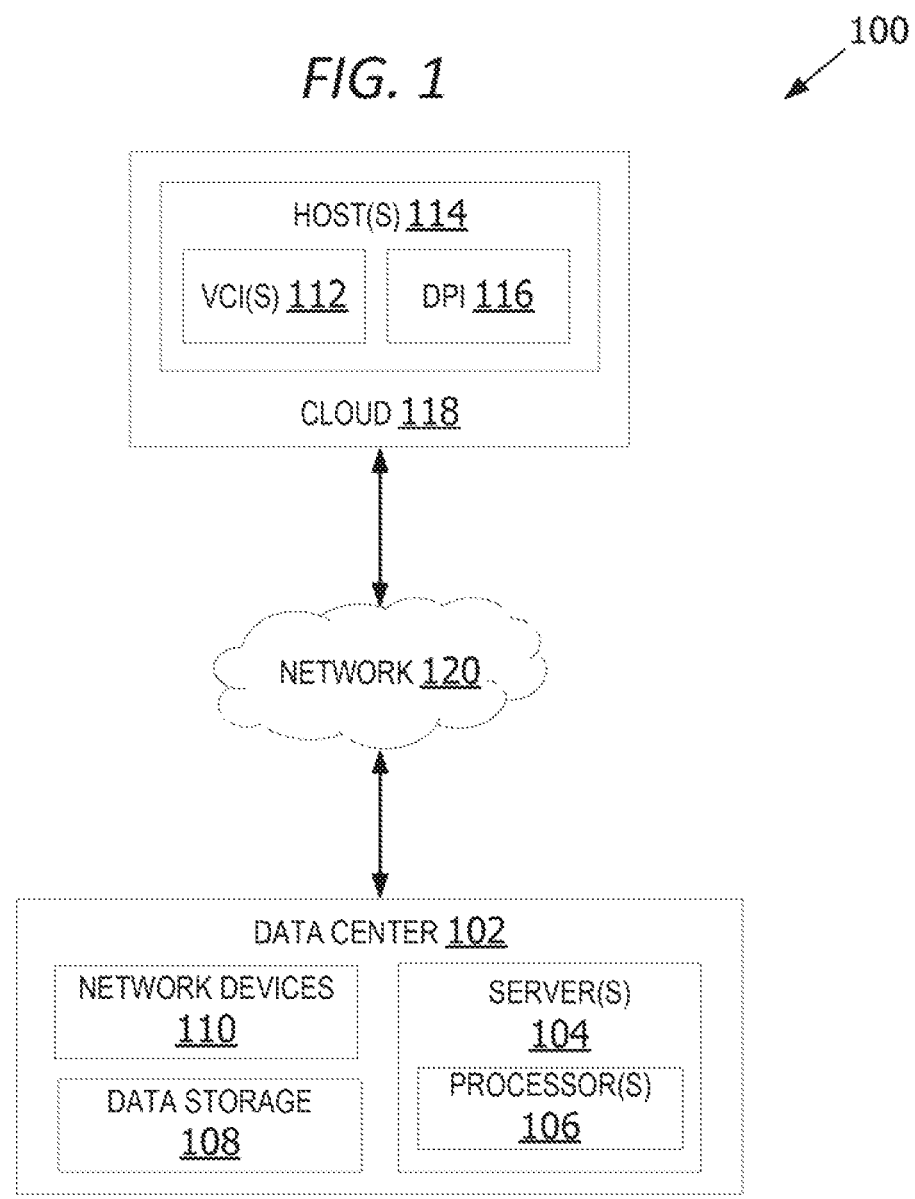
FIG. 1 is an exemplary block diagram illustrating a system for deep packet inspection of network data packets at a VNIC level.

Referring to FIG. 1, an exemplary block diagram illustrates a system 100 for deep packet inspection of network data packets. The data center 102 in this example is a virtualized data center including one or more server(s) 104, one or more processor(s) 106, data storage 108, and/or network devices 110 for providing network resources to one or more VCIs 112. A VCI may include a VM, a container, or any other type of VCI, as further described herein.

In this example, the data center 102 includes one or more physical computing devices such as, but not limited to, one or more server(s) 104, processor(s) 106, and/or data storage 108 device(s) in communication with each other over one or more physical networks. The server(s) 104 may include a single server, as well as two or more servers in a cluster. In some examples, the set of servers includes a rack scale architecture (RSA) housing a plurality of physical servers. In yet other examples, the set of servers includes one or more blade servers. In still other examples, the set of servers is implemented as a cluster of host computer systems for hosting a plurality of virtual machines, such as a VMware vSphere® cluster using technology available from VMware, Inc.

The set of servers may support any type or types of VCI. A VCI may optionally be part of a cloud 118, which may be implemented as a private cloud, a public cloud, or a hybrid cloud. A hybrid cloud is a cloud that includes resources located in both a public cloud and a private cloud or data center. vCloud® Hybrid Service™ available from VMware, Inc. is an example of a hybrid cloud implementation. Cloud services are optionally provided by cloud 118 to clients via a network 120.

The data center 102 may optionally host a set of one or more VCIs (not shown) running on one or more servers 104. A VCI includes a VM, a container, and/or any other form of VCI. A VM typically includes an operating system (OS) running one or more applications or portions of an application to perform a workload. VMs running on a host utilize cluster resources to perform the workloads.

The data storage 108 device(s) in this non-limiting example includes one or more devices for storing data. The data storage device(s) may be implemented as any type of data storage, including, but without limitation, a hard disk, optical disk, a redundant array of independent disks (RAID), a solid-state drive (SSD), a flash memory drive, a storage area network (SAN), or any other type of data storage device. The data storage device(s) may include rotational storage, such as a disk. The data storage device(s) may also include non-rotational storage media, such as SSD or flash memory. In one embodiment, data storage 108 is integrated with servers 104, for example, in a distributed manner using a virtual SAN in which each server 104 contributes storage to a pool of virtual storage.

In some non-limiting examples, the data storage 108 device(s) provide a shared data store. The shared data store is a data storage accessible by two or more hosts in the cluster.

The set of servers 104 includes one or more processor(s) 106. The one or more processor(s) 106 may be implemented as one or more central processing units (CPUs) and may include one or more dedicated graphical processing units (GPUs). In some examples, the deep packet inspection (DPI) engine 116 is executed by one or more CPUs. In still other examples, at least some operations of the DPI engine 116 are executed by one or more GPUs.

The network device(s) 110 include physical network components underlying the virtual network. The physical network components may include, without limitation, routers, switches, NICs, and other network devices.

The VCI(s) 112 run on one or more hosts 114. The host(s) 114 optionally run on a cloud 118 platform. The cloud 118 may be implemented as a public cloud, a private cloud, or a hybrid cloud.

The network 120, in some examples, is a Wide Area Network (WAN) accessible to the public, such as the Internet. The cloud services are provided via one or more physical servers, such as one or more servers 104 in data center 102.

The DPI engine 116 performs packet inspection of network data packets sent and/or received via one or more VNICs. In some examples, network data packets are received from the operating system, and sent to the VNIC. The network data packets are mirrored from the VNIC to a mirrored NIC (MNIC), such as by the DPI engine 116. Alternatively, the MNIC sends the packet to the DPI engine 116. The DPI engine 116 de-capsulates the data packet and sends it to one or more packet analyzers for security operations. The results of the security operations performed by the packet analyzers are sent to control logic. The control logic analyzes the results to determine whether to accept or drop the packet.

Alternatively, ingress packets are de-capsulated by a VTEP ("VXLAN Tunnel Endpoint" or "Virtual Tunnel Endpoint" rather than the DPI engine 116. In this embodiment, the packet is intercepted from the VTEP and replicated at that time, or when the inner packet returns to the virtual switch, to the packet analyzers.

The determination to accept or drop the packet is made at a policy enforcement agent, enforcer, or other point. In some examples, the policy enforcement point is a VNIC. In these examples, the VNIC discards or routes the data packet based on the packet analysis results received from the plurality of packet analyzers. In other examples, the policy enforcement point occurs at the virtual switch, the virtual router, the NIC, a VCI, the hypervisor, or some other component within the cluster.

Figure 2:
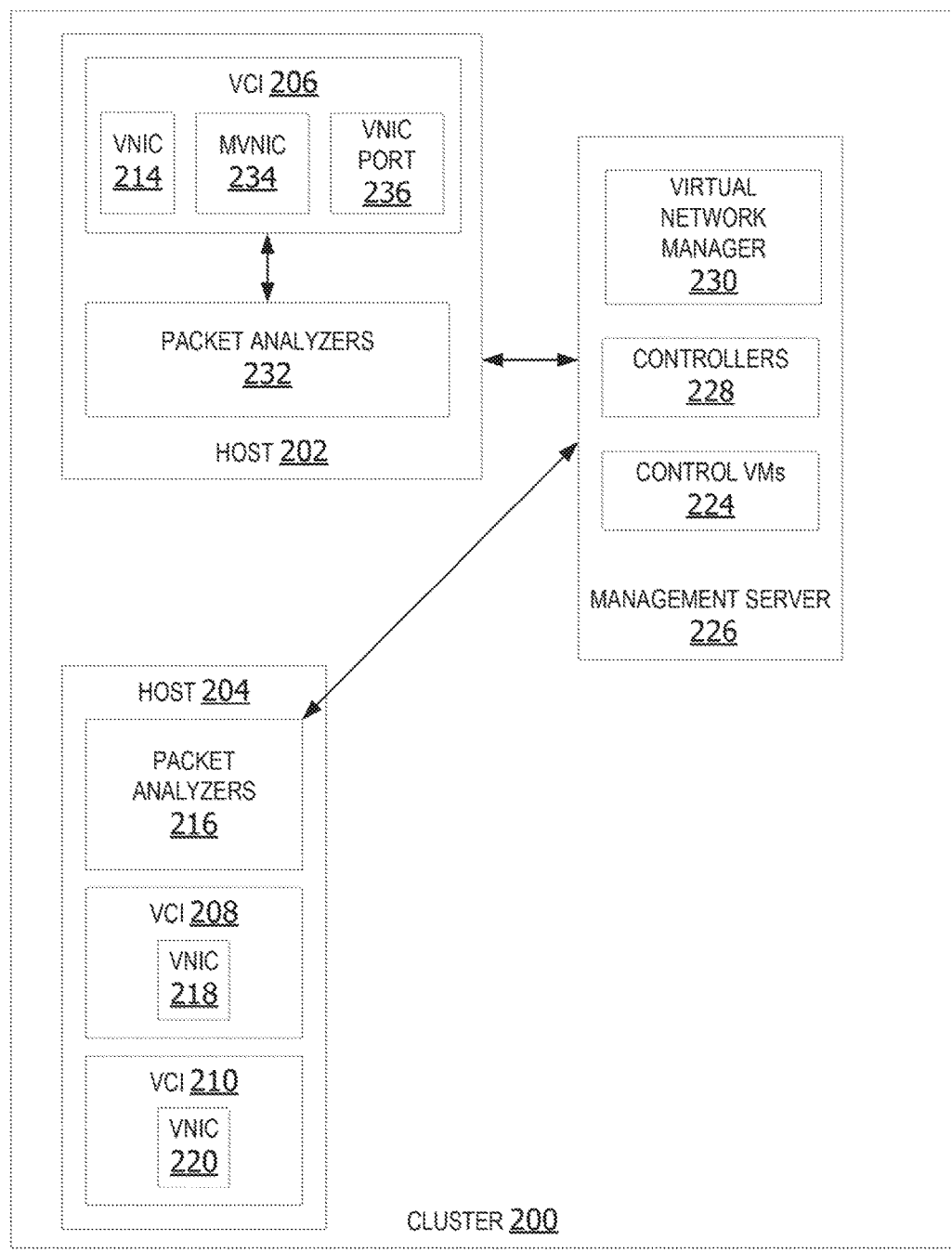
FIG. 2 is an exemplary block diagram illustrating a host cluster.

FIG. 2 is an exemplary block diagram illustrating a host cluster. The cluster 200 is a collection of two or more hosts, such as, but not limited to, host 202 and host 204. Host 202 and 204 may be implemented as a physical server or a hypervisor in a cloud, such as cloud 118 in FIG. 1.

The hosts in the cluster include one or more VCIs and a set of packet analyzers within the system data plane. For example, the host 202 supports VCI 206. Likewise, host 204 includes VCI 208 and VCI 210. The hosts supporting the VCIs are located within a data plane of the system architecture. In this example, the VCIs are VMs. However, in other examples, the VCIs may include containers.

The one or more packet analyzers on each host perform security operations on network data packets received by the host. In some examples, the packet analyzers on a given host perform packet inspection operations on data packets associated with all VCIs on the host.

In some examples, a packet analyzer is an analysis engine running on the hypervisor kernel. In other examples, a packet analyzer runs on a VCI, such as virtual appliance or a privileged VCI that includes a virtual switch, hardware device drivers, etc. In still other examples, a packet analyzer runs on a hypervisor but not in the kernel space, i.e., in user space. Thus, the packet analyzers may be loaded onto the hypervisor kernel or user space, loaded onto a privileged or other VCI, or loaded onto another component within a host cluster.

The packet analyzers on a given host performs packet inspection on network data packets received by one or more VNICs associated with the given host. The packet inspection refers to the performance of one or more security operations on the received network data packet.

In this example, host 202 includes packet analyzers 232. The packet analyzers 232 performs packet inspection on network data packets received by VNIC 214. In some examples, the network data packets received by the VNIC 214 are ingress packets received by a given VCI. In other examples, the network data packet received by the VNIC 214 is an egress packet sent by the VCI. Likewise, packet analyzers 216 on host 204 performs packet inspection on network data packets received from VNIC 218 and VNIC 220.

Each VCI is associated with at least one VNIC. In some examples, each VCI also includes a mirrored VNIC and/or mirrored VNIC port, such as MVNIC 234 and MVNIC port 236 associated with VCI 206. The VNIC mirroring and/or VNIC port mirroring is performed in a one-to-one (1:1) mapping in this example. The network traffic from a given mirrored VNIC is fed into the packet analyzers for the enhanced security features for deep packet inspection. The packet analyzers analyze the network traffic in parallel and output an allow or deny recommendation. If any packet analyzer outputs a deny recommendation, the deny recommendation overrides the other accept recommendations, in some examples. In other examples, a percentage threshold or numerical threshold of deny recommendations from the packet analyzers is required to result in a deny recommendation.

The packet analyzers on a given host may be created or implemented by a virtual network manager 230. The virtual network manager 230 controls implementation of packet analyzers and control VMs associated with each packet analyzer. In this example, the virtual network manager 230 is shown executing on a management server 226 as shown in the cluster 200. In other examples, the virtual network manager executes on a server other than the management server 226. In still other examples, the management server 226 may be located remotely from the one or more servers running the VCI hosts.

In some examples, the virtual network manager 230 creates and deploys the individual control VMs 224 when implementing the packet analyzers during initialization and/or provisioning of the host. In other examples, the virtual network manager 230 deploys a control VM during updating/modification of the packet analyzers. Control VMs are described in further detail below with reference to FIG. 5. Instead of control VMs, namespace containers or other computing resource may be used.

The virtual network manager 230 in some examples is implemented as a Software Defined Networking (SDN) manager such as the NSX® Manager from VMware, Inc. SDN managers are used to implement logical overlay networks to connect VCIs on network abstractions which are decoupled from the underlying physical network infrastructure. This decoupling is generally implemented using some tunneling protocol such as VXLAN, Geneve, or other tunneling protocol. In still other examples, the virtual network manager 230 is implemented on a management server, such as VMware's vCenter Server. The management server 226 is a server for hosting control VMs 224 and controllers 228. Although shown on a single management server 226 in the embodiment of FIG. 2, controllers 228, control VMs 224, and virtual network manager 230 may be distributed across multiple other hosts or servers. For example, controllers 228, and virtual network manager 230 may be implemented as a virtual machine or other form of VCI, or directly on a physical host.

Any modifications made to the configuration of the control VMs 224 are relayed to the controllers 228 associated with the control plane. The controllers 228 relay the configuration change information bases (IBs) back to the packet analyzers at the data plane.

The management server 226 may be implemented as a physical server, such as a server in the server(s) 104 in FIG. 1. In other examples, the management server 226 in other examples may be implemented as cloud server, such as a host in host(s) 114 in FIG. 1.

Figure 3:
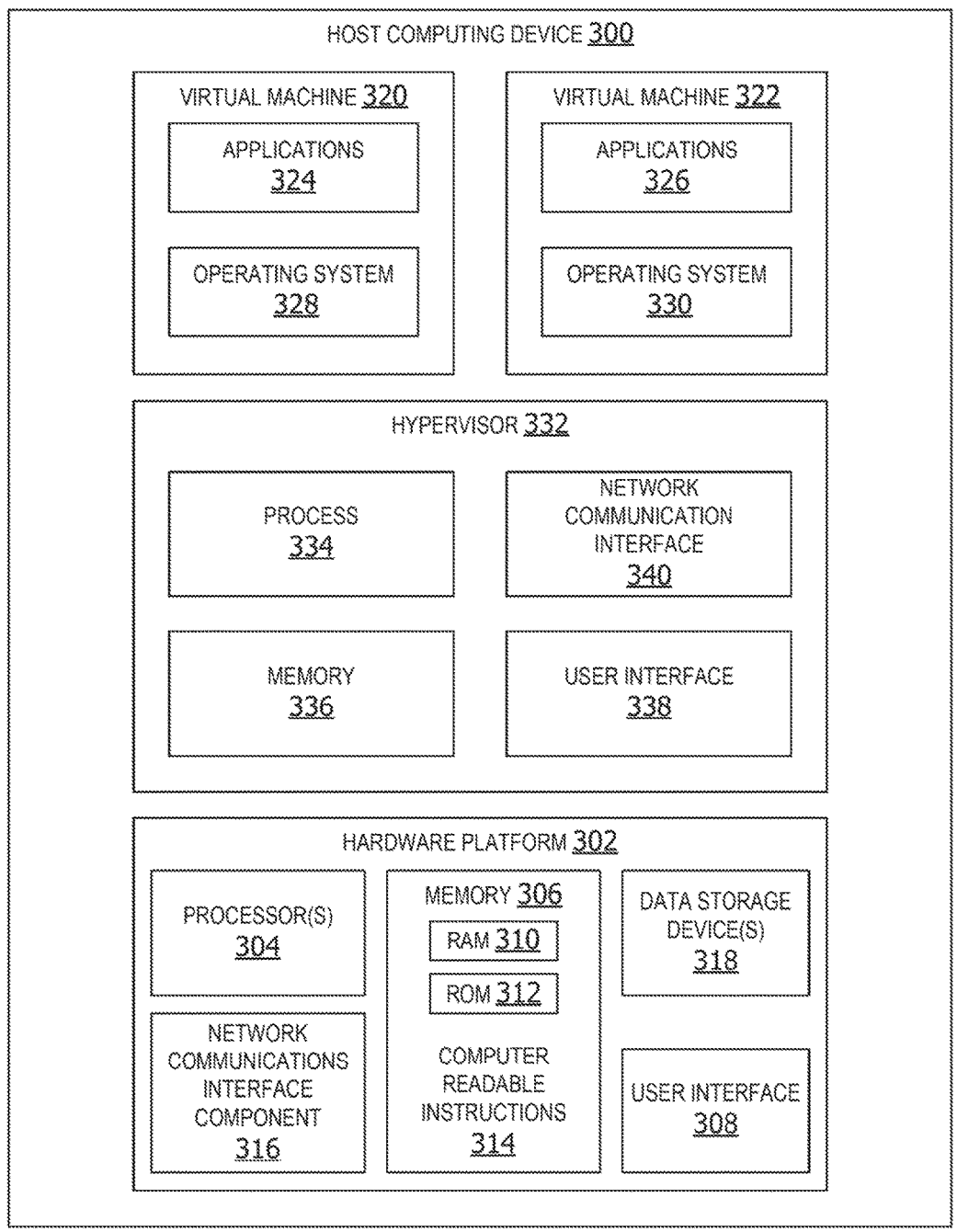
FIG. 3 is an exemplary block diagram illustrating a host computing device.

FIG. 3 is an exemplary block diagram illustrating a host computing device supporting one or more VCIs on a host. The illustrated host computing device 300 may be implemented as any type of computing device for supporting one or more VCIs, such as a server in the server(s) 104 of FIG. 1. In some non-limiting examples, the host computing device 300 is implemented as a host or ESXi host from VMware, Inc. The host computing device 300 is a host for running one or more VMs.

The host computing device 300 represents any device executing instructions (e.g., as application(s), operating system, operating system functionality, or both) to implement the operations and functionality associated with the host computing device 300. The host computing device 300 may include desktop personal computers, kiosks, tabletop devices, industrial control devices, or server, such as, but not limited to, a server in the data center 102 in FIG. 1. In some examples, the host computing device 300 is implemented as a blade server within a rack scale architecture. Additionally, the host computing device 300 may represent a group of processing units or other computing devices.

The host computing device 300 includes a hardware platform 302. The hardware platform 302, in some examples, includes one or more processor(s) 304, a memory 306, and at least one user interface, such as user interface component 308.

The processor(s) 304 includes any quantity of processing units, and is programmed to execute computer-executable instructions for implementing the examples. The instructions may be performed by the processor or by multiple processors within the host computing device 300, or performed by a processor external to the host computing device 300. In some examples, the one or more processors are programmed to execute instructions such as those illustrated in the figures (e.g., FIG. 6, FIG. 7, and FIG. 8).

The host computing device 300 further has one or more computer readable media, such as the memory 306. The memory 306 includes any quantity of media associated with or accessible by the host computing device 300. The memory 306 may be internal to the host computing device 300, external to the host computing device, or both. In some examples, the memory 306 includes read-only memory (ROM) 312.

The memory 306 further stores a random-access memory (RAM) 310. The RAM 310 may be any type of random access memory. In this example, the RAM 310 is part of a shared memory architecture. In some examples, the RAM 310 may optionally include one or more cache(s). The memory 306 further stores one or more computer-executable instructions 314.

The host computing device 300 may optionally include a user interface 308 component for providing user input, and may include a graphical user interface, command line interface, or application programming interface. In some examples, the hardware platform 302 includes a network communications interface component 316. The network communications interface component 316 includes one or more network interface controllers (NICs) host bus adapters, etc.

The data storage device(s) 318 may be implemented as any type(s) of data storage, including, but without limitation, a hard disk, optical disk, a redundant array of independent disks (RAID), a solid-state drive (SSD), a flash memory drive, a storage area network (SAN), or any other type of data storage device. In some non-limiting examples, the data storage device(s) 318 include a shared data store (not shown) accessible via a network. A shared data store is a data storage accessible by two or more hosts in a host cluster.

The host computing device 300 hosts one or more VCIs such as, but not limited to, VMs 320 and 322. The VM 320 in some examples, includes data such as, but not limited to, one or more application(s) 324. The VM 322 in this example includes applications(s) 326. The application(s), when executed by the processor(s) 304, operate to perform functionality on the host computing device 300.

Exemplary application(s) include, without limitation, server applications such as web servers, application servers, databases, etc., or desktop applications such as mail applications, web browsers, word processors, or other user productivity applications.

VM 320 includes guest operating system (OS) 328 and VM 322 includes guest OS 330. Each guest operating system may be a standard production operating system such as those based on Linux or Windows.

The host computing device 300 further includes one or more computer executable components. Exemplary components include a hypervisor 332. The hypervisor 332 includes, for each VM 320, 322, a VM monitor that emulates virtual hardware and a hypervisor kernel for managing physical resources of host 300. In other embodiments (not shown) hypervisor 322 may include a privileged virtual machine for performing I/O operations on behalf of VMs 320, 322.

Figure 4:
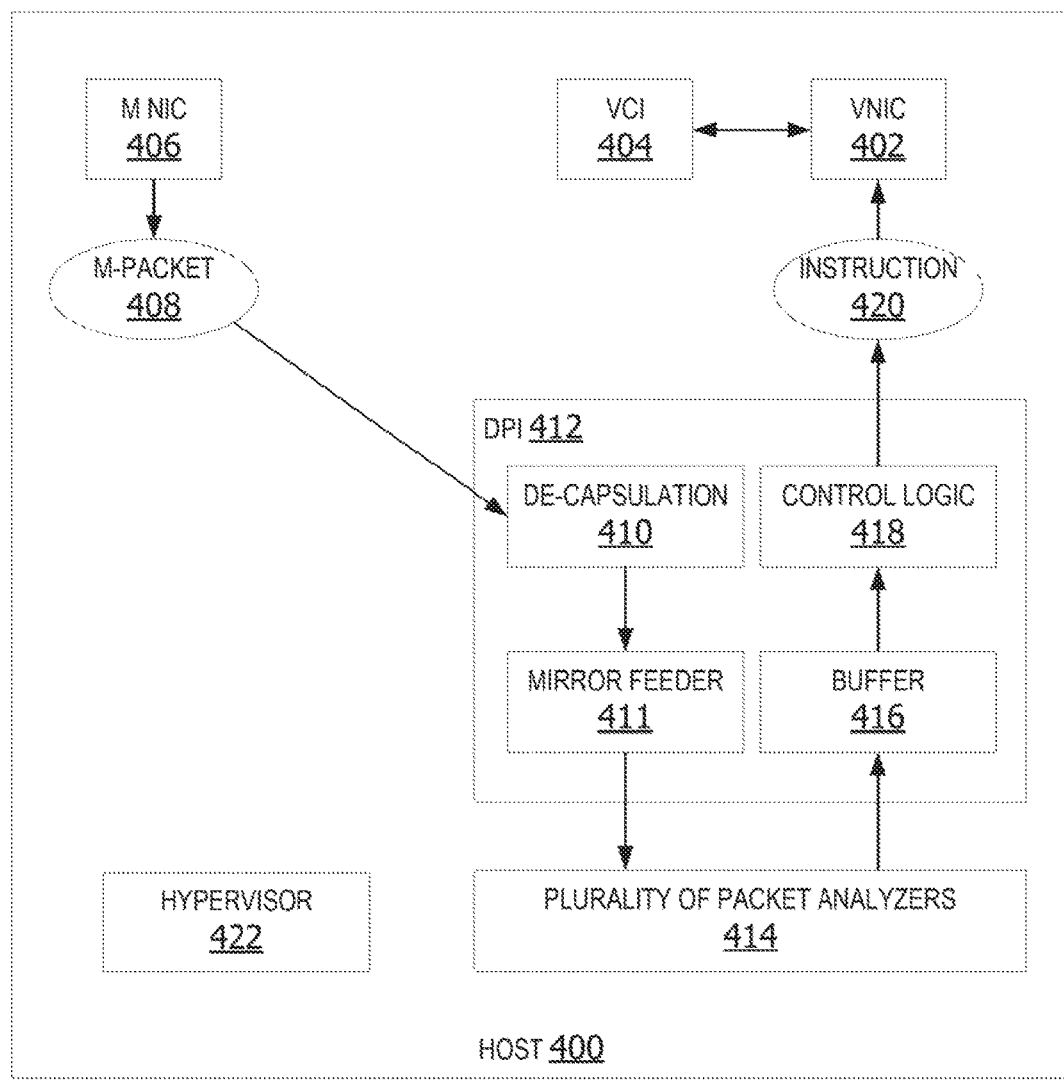
FIG. 4 is an exemplary block diagram illustrating a host including a deep packet inspection and a plurality of packet analyzers.

FIG. 4 is an exemplary block diagram illustrating a host including a DPI engine 412 and a plurality of packet analyzers 414. The host 400 is capable of running one or more VCIs. The host 400 is a physical computer system that may run in a datacenter or cloud environment.

In this example, a VNIC 402 is associated with each VCI 404 (only one shown) running on the host 400. Each VNIC is associated with a corresponding mirrored VNIC (MNIC) which is instantiated or otherwise implemented by the hypervisor 422. In other words, the hypervisor 422 creates an MNIC for each VNIC. All network traffic received by a given VNIC is copied onto the corresponding MNIC associated with the given VNIC.

In this example, VNIC 402 corresponds to VCI 404. The VNIC 402 sends and receives network data packets via a logical overlay network deployed on top of the physical network hardware. The network data packet is mirrored onto an MNIC 406. The network data packet in this example is an ingress data packet received by the VNIC 402. In other examples, the data packet is an egress data packet to be sent by the VNIC. In some examples, a distributed workflow switch allows mirroring.

The MNIC sends the port mirrored data packet (m-packet) 408 to a de-capsulation engine 410 of the DPI engine 412. The input from the port mirrored VNIC is fed into the DPI engine 412. The DPI engine 412 de-capsulates the port mirrored network traffic input. The de-capsulated output from the de-capsulation engine 410 provides input for various packet analyzers, such as plurality of packet analyzers 414

In some examples, the de-capsulation engine 410 removes one or more layers of encapsulated data from the mirrored data packet. The de-capsulated mirrored data packet is output to a mirror feeder 411. The mirror feeder 411 copies the de-capsulated, mirrored data packet to each packet analyzer in a plurality of packet analyzers 414 on the host 400. In some examples, the packet analyzers are components that are loaded into an operating system kernel on demand. In these examples, the plurality of packet analyzers are pluggable modules.

If the packet inspection of the mirrored data packet is to be performed by a single packet analyzer, the mirrored data packet is fed as input directly into the given packet analyzer. However, if multiple security operations are to be performed by more than one packet analyzer, the mirrored data packet is duplicated into multiple copies of the mirrored data packet. A copy of the mirrored data packet is fed as input into each packet analyzer that is to perform packet inspection operations on the data packet. The packet analyzers are fed in this manner in parallel or substantially in parallel. In other words, the packet analyzers are sent the mirrored data at about the same time.

Upon receiving the copy of the mirrored data packet, each packet analyzer processes the copy of the mirrored data packet. The processing includes performing one or more security operations on the copy of the mirrored data packet, in parallel or substantially in parallel. The security operations include any known security operations. The packet analyzers perform their respective security functions on the input data in parallel. When the packet inspection is complete, each packet analyzer generates a recommendation. The packet analyzers decide whether to allow or deny the network traffic. In some examples, the output from each packet analyzer is a zero (0) or a one (1). A zero indicates a deny recommendation. A one indicates an allow recommendation. If the data packet passes the inspection or is approved by the inspection, the packet analyzer outputs an allow recommendation (e.g., allow routing of the packet to its destination). If the data packet fails the inspection, the packet analyzer generates a deny recommendation.

The recommendation generated by each packet analyzer is output to a buffer 416. The buffer 416 keeps track of the unique processed outputs (e.g., recommendations) for unique network traffic from the various enhanced security feature packet analyzers. The buffer 416 outputs the collected recommendations to control logic 418. In some examples, all packet analyzers in the plurality of packet analyzers 414 performs security operations on the copies of the mirrored data packet. In these examples, the buffer collects recommendations from all the packet analyzers prior to sending the buffered output to control logic 418.

In other examples, a subset of one or more packet analyzers in the plurality of packet analyzers performs security operations on the copies of the mirrored data packet. The buffer 416 collects recommendations from each packet analyzer in the subset of packet analyzers prior to sending the buffered output to the control logic 418. The hypervisor, in communication with virtual network manager 230 (FIG. 2), in some examples determines which packet analyzers perform security operations and which packet analyzers do not perform security operations on the copies of the mirrored data packet based on information in the header of the data packet, user-defined policy data, configuration data, or other rules for performing security operations on network data packets. A user may define these policies via virtual network manager 230 which are then communicated to the hypervisor for implementation. In some examples, the DPI engine 412 determines which packet analyzers should receive copies of the mirrored data packet based on the data packet headers.

The control logic 418 analyzes and compares the buffered output received from the buffer 418 to determine whether to accept the network data packet or discard the network data packet received by the VNIC 402. The buffered output includes a recommendation from each packet analyzer performing security operations on the copies of the mirrored data packet. The recommendation is a processed output decision to allow or deny the packet which is generated by a packet analyzer.

The control logic 418 decides whether the network traffic is to be allowed or denied at a policy enforcement point. The control logic 418 gives deny recommendations precedence over allow recommendations, in some examples.

In this example, the policy enforcement point is a VNIC. The determination whether to allow or deny the network data packet occurs at the VNIC level. If one or more recommendations in the buffered output is a deny recommendation, the control logic 418 sends an instruction 420 to the VNIC 402 to discard the data packet. If all the recommendations in the buffered output are allow recommendations, the control logic 418 sends an instruction 420 to the VNIC 402 to route the data packet to its destination. In some examples, the control logic 418 remains at the data plane associated with the VCIs and packet analyzers.

Figure 5:
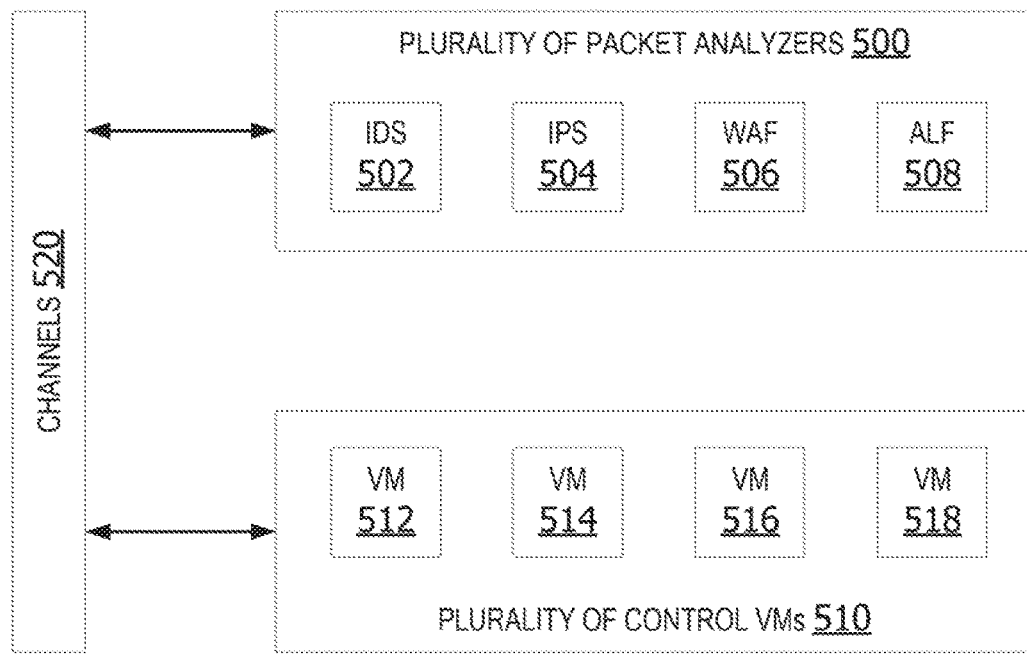
FIG. 5 is an exemplary block diagram illustrating a plurality of packet analyzers and control VMs.

FIG. 5 is an exemplary block diagram illustrating a plurality of packet analyzers 500 and control VMs. The plurality of packet analyzers 500 includes one or more packet analyzers. In this example, the plurality of packet analyzers includes packet analyzers 502, 504, 506, and 508. However, in other examples, the plurality of packet analyzers may include any quantity of packet analyzers.

Each packet analyzer performs one or more security operations on a given copy of a mirrored data packet received from the VNIC (e.g., via an MNIC). In this non-limiting example, the packet analyzer 502 includes intrusion detection systems (IDS) security features, packet analyzer 504 includes intrusion prevention systems (IPS) security features, packet analyzer 506 includes web application firewall (WAF) security operations, and packet analyzer 508 performs application layer firewall (ALF) security operations on a copy of a mirrored network data packet. The ALF security operations in some examples are content filtering capable operations. The packet analyzers are not limited to the examples shown in FIG. 5. Therefore, packet analyzers 500 may perform security operations not shown in FIG. 5.

The network traffic from mirrored VNIC are fed into the plurality of packet analyzers 500 for these enhanced security features. The packet analyzers process data packets and decide if the VNIC(s) should accept or drop the packets directed to or from the routing and switching plane. The routing and switching plane refers to the physical routers, physical switches, distributed logical router (DLR), and/or logical switches associated with the network.

In some examples, the packet analyzers process copies of the mirrored network data packet via the security operations in parallel. As each packet analyzer completes performance of the packet inspection in accordance with the security operation(s) associated with each packet analyzer, each packet analyzer generates a recommendation. If a given copy of a mirrored network data packet passes the packet inspection performed by the given packet analyzer, the given packet analyzer outputs an allow recommendation. If the data packet fails the packet inspection, the given packet analyzer outputs a deny recommendation.

The recommendation in some examples is output to a buffer which gathers recommendations from all the packet analyzers processing the given mirrored network data packet. When all recommendations have been received, the collected recommendations are sent to the control logic as buffered output. In other examples, the allow or deny recommendation is output to control logic.

A plurality of control VMs 510 within a control plane is associated with the plurality of packet analyzers within the data plane. In this example, each packet analyzer is associated with a corresponding control VM with high availability (HA). For example, packet analyzer 502 is associated with control VM 512. Packet analyzer 504 is controlled and managed by control VM 514.

Communications between the packet analyzers in the data plane and the control VMs in the control plane occurs via dedicated channels 520 between the control VMs and packet analyzers. The channels 520 includes a dedicated channel for each packet analyzer between the control plane and the data plane. In some examples, the control VMs are running on a management server within the cluster. However, in other examples, the control VMs may run on the same host as the packet analyzers. In this example, a separate control VM corresponds to each packet analyzer. However, in other examples, the control VMs are consolidated into a single controller for all the packet analyzers.

In some examples, the channels 520 include one or more daemons. For example, each analyzer may have a corresponding daemon for communicating with its respective controller VM. For example, if changes are made to a control VM, the configuration changes are relayed to the corresponding packet analyzer via the channels. Likewise, information associated with configuration changes to multiple control VMs on the control plane are relayed to the corresponding packet analyzers at the data plane via the channels.

In other examples, a control VM presents a graphical user interface (GUI). The GUI groups objects in accordance with one or more security related criteria associated with the packet analyzer security operations. In still other examples, the GUI tags objects with one or more security tags.

Figure 6:
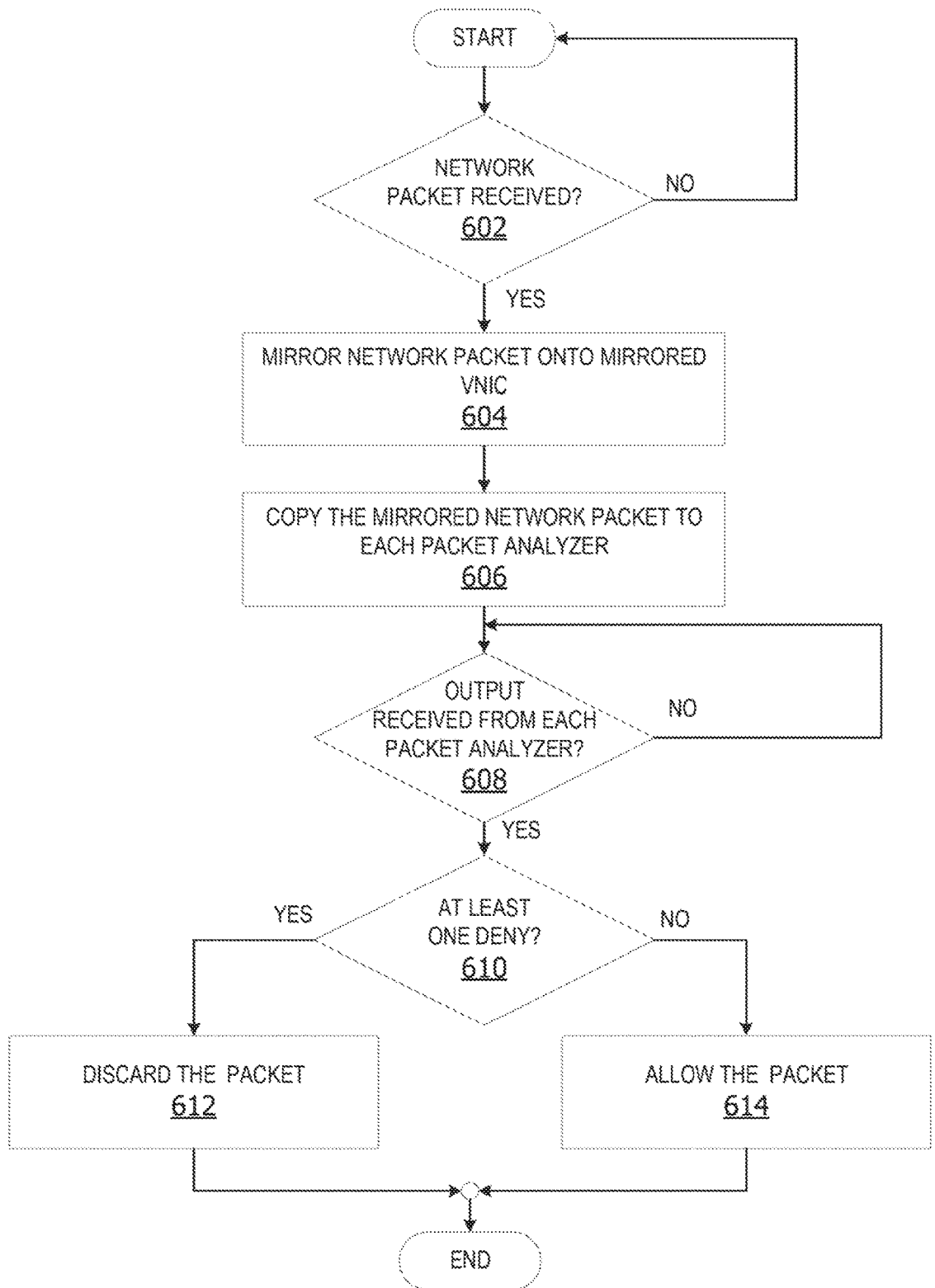
FIG. 6 is an exemplary flow chart illustrating deep packet inspection of network data packets.

FIG. 6 is an exemplary flow chart illustrating deep packet inspection of network data packets. The process shown in FIG. 6 may be performed by a DPI on a computing device, such as, but not limited to, the DPI engine 116 in FIG. 1 and the DPI engine 412 in FIG. 4. The computing device may be implemented as a device such as, but not limited to, a server 104 associated with the data center 102 or host computing device 300 in FIG. 3. Further, execution of the operations illustrated in FIG. 6 is not limited to a DPI module. One or more computer-readable storage media storing computer-readable instructions may execute to cause at least one processor to implement the operations illustrated in FIG. 6.

The process begins by deciding whether a network packet is received at 602. If yes, the network packet is mirrored onto a VNIC at 604. The mirrored network packet is copied to each packet analyzer in a plurality of packet analyzers at 606.

A determination is made as to whether output is received from each packet analyzer at 608. If yes, a determination is made whether the packet analyzer output includes at least one deny recommendation at 610. If yes, the network packet is discarded at 612 and the process terminates thereafter.

Returning to 610, if the output does not include at least one deny, the network packet is accepted at 614 and the process terminates thereafter.

While the operations illustrated in FIG. 6 are described as being performed by a host computing device or a server, aspects of the disclosure contemplate that performance of the operations by other entities. For example, a cloud service may perform one or more of the operations.

Figure 7:
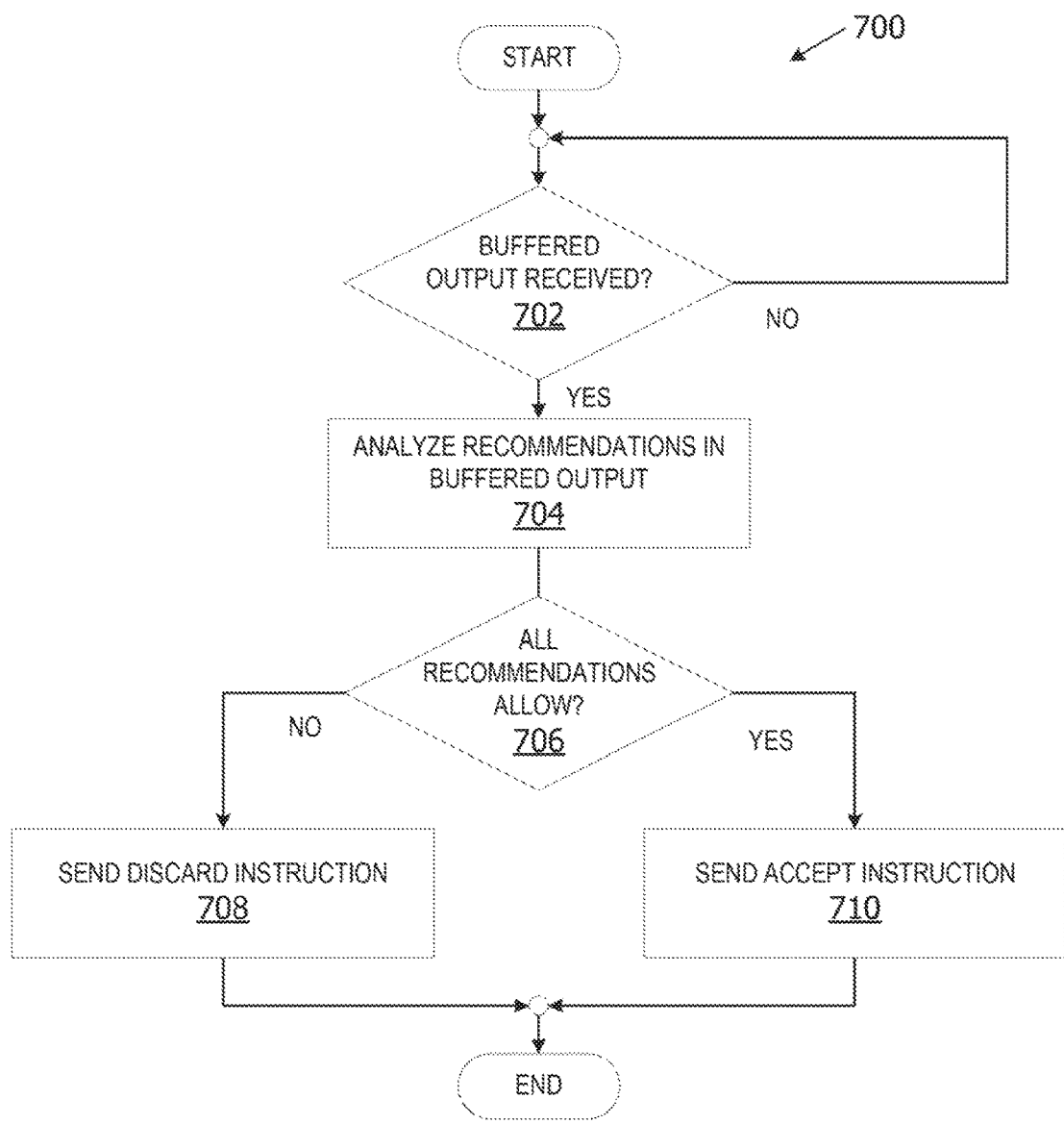
FIG. 7 is an exemplary flow chart illustrating operation of a VNIC for discarding or allowing a network data packet.

FIG. 7 is an exemplary flow chart illustrating operation of a VNIC discarding or allowing a network data packet. The process shown in FIG. 7 may be performed by a DPI engine on a computing device, such as, but not limited to, the DPI engine 116 in FIG. 1 and the DPI engine 412 in FIG. 4. The computing device may be implemented as a device such as, but not limited to, a server 104 associated with the data center 102 or host computing device 300 in FIG. 3. Further, execution of the operations illustrated in FIG. 7 is not limited to a DPI module. One or more computer-readable storage media storing computer-readable instructions may execute to cause at least one processor to implement the operations illustrated in FIG. 7.

The process makes a determination as to whether buffered output is received from a buffer at 702. If yes, recommendations in the buffered output are analyzed at 704. A determination is made as to whether all recommendations are allow recommendations at 706. If not, a discard instruction is sent to the VNIC at 708 and the process terminates thereafter.

Returning to 706, if all the recommendations in the buffered output are allow recommendations, an allow instruction is sent to the policy enforcement point at 710 and the process terminates thereafter.

While the operations illustrated in FIG. 7 are described as being performed by a host computing device or a server, aspects of the disclosure contemplate that performance of the operations by other entities. For example, a cloud service may perform one or more of the operations.

In FIG. 7, the buffered output is sent to a policy enforcement point. In this non-limiting example, the policy enforcement point is control logic associated with a VNIC. The VNIC routes the data packet or discards the data packet based on the recommendations received in the buffered output. In other examples, the policy enforcement point may be a VCI, virtual switch, virtual router, or some other virtual network component.

Figure 8:
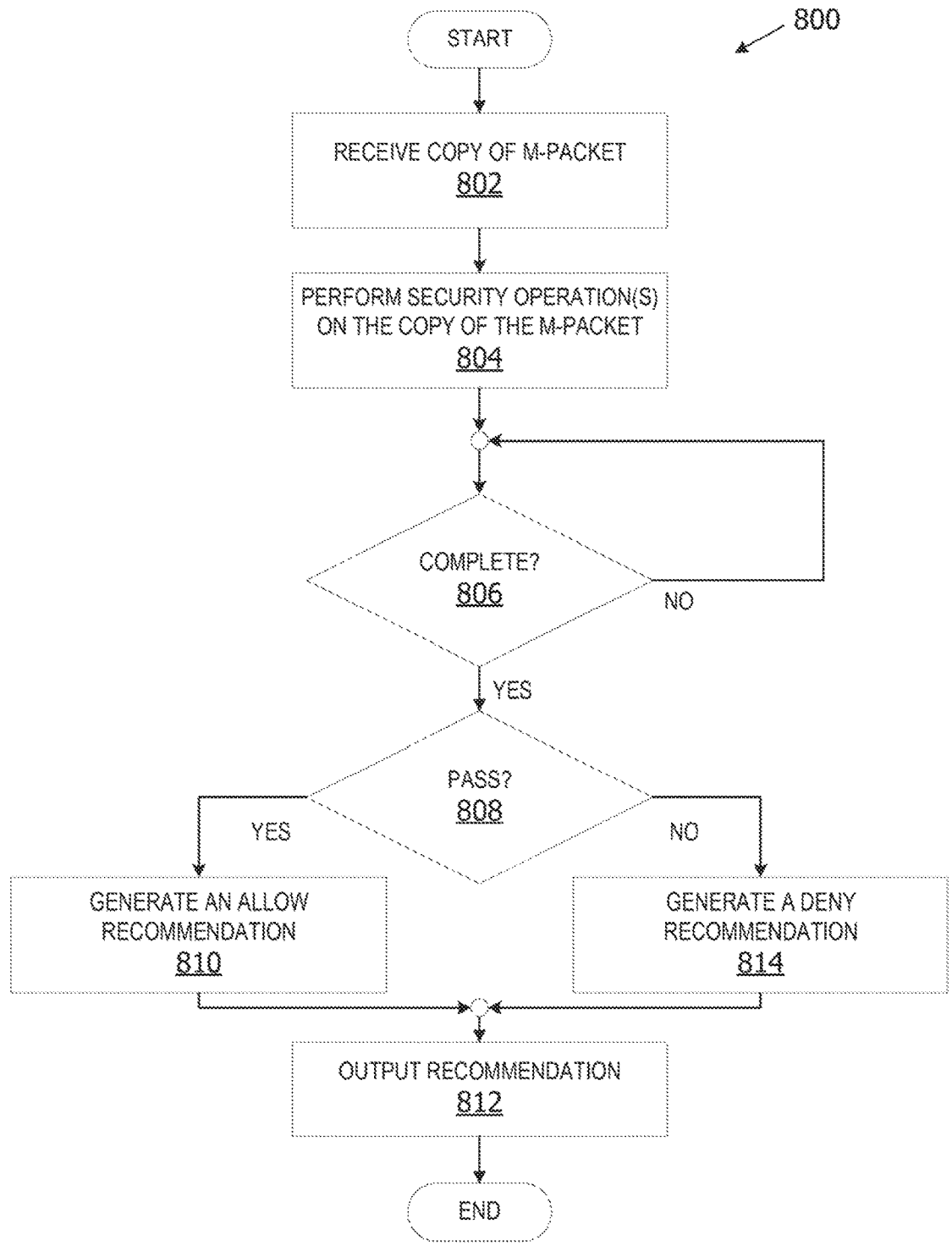
FIG. 8 is an exemplary flow chart illustrating operation of a packet analyzers for performing security operation(s) on a copy of a mirrored data packet.

FIG. 8 is an exemplary flow chart illustrating operation of a packet analyzers for performing security operation(s) on a copy of a mirrored data packet. The process shown in FIG. 8 may be performed by a plurality of packet analyzers on a host, such as, but not limited to, packet analyzers 212 and 216 in FIG. 2, plurality of packet analyzers 414 in FIG. 4, and the plurality of packet analyzers 500 in FIG. 5. The computing device may be implemented as a device such as, but not limited to, a server 104 associated with the data center 102 or host computing device 300 in FIG. 3. Further, execution of the operations illustrated in FIG. 8 is not limited to a deep packet inspection module. One or more computer-readable storage media storing computer-readable instructions may execute to cause at least one processor to implement the operations illustrated in FIG. 8.

A copy of a mirrored network data packet (m-packet) is received at 802. One or more security operations are performed on the copy of the mirrored network data packet at 804. A determination is made as to whether the security operation(s) are complete at 806. If yes, a determination is made as to whether the copy of the mirrored data packet passes inspection because of performing the security operation(s) at 808. If yes, the packet analyzer generates an allow recommendation at 810. The allow recommendation is output to a control logic at 812 and the process terminates thereafter.

Returning to 808, if the copy of the mirrored data packet does not pass inspection, a deny recommendation is generated at 814. The deny recommendation is output to the control logic at 812 and the process terminates thereafter.

While the operations illustrated in FIG. 8 are described as being performed by a host computing device or a server, aspects of the disclosure contemplate that performance of the operations by other entities. For example, a cloud service may perform one or more of the operations.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In some examples, VMs may be used alternatively or in addition to the containers, and hypervisors may be used for the hardware abstraction layer. In these examples, each VM generally includes a guest operating system in which at least one application runs.

For the container examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices. In some examples, the computing system environment includes a first computer system at a first site and/or a second computer system at a second site. The first computer system at the first site in some non-limiting examples executes program code, such as computer readable instructions stored on non-transitory computer readable storage medium.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices, network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for performing deep packet inspection at a VNIC level. For example, the elements illustrated in FIG. 1, FIG. 2, FIG. 3, FIG. 4, and FIG. 5, such as when encoded to perform the operations illustrated in FIG. 6, FIG. 7 and FIG. 8 constitute exemplary means for receiving copies of a mirrored network data packet, exemplary means for performing security operations on the received copies of the mirrored network data packet by each packet analyzer in parallel; exemplary means for generating a recommendation for the network data packet, by each packet analyzer, the recommendation comprising an allow recommendation or a deny recommendation; and exemplary means for outputting the recommendation from each packet analyzer to a virtual network interface controller (VNIC), the VNIC discards a network data packet or allows the network data packet to continue to its destination based on the output recommendations.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method for performing security operations associated with network traffic, the method comprising:
   receiving, by a plurality of packet analyzers, copies of a network data packet, each packet analyzer in the plurality of packet analyzers receives a copy of the mirrored network data packet from a mirror feeder;
   performing security operations on the received copies of the mirrored network data packet by each packet analyzer in parallel;
   generating a recommendation for the network data packet, by each packet analyzer module, the recommendation comprising an allow recommendation or a deny recommendation; and
   outputting the recommendation from each packet analyzer to a virtual network interface controller (VNIC), the VNIC discarding a network data packet or allowing the network data packet based on the output recommendations.

2. The method of claim 1, wherein the VNIC further:
   discards the network data packet if at least one recommendation is a deny recommendation; and
   routes the network data packet to a destination if all the received recommendations generated by the plurality of packet analyzers are allow recommendations.

3. The method of claim 1, further comprising creating the packet analyzers by a virtual network manager associated with a management server.

4. The method of claim 1, further comprising creating a control virtual machine (VM) corresponding to each of the packet analyzers.

5. The method of claim 1, further comprising connecting each of the packet analyzers to a corresponding control VM via a dedicated channel.

6. The method of claim 5, further comprising sending configuration data associated with a change to a control VM to a corresponding packet analyzer via a daemon.

7. The method of claim 1, wherein at least one graphics processing unit (GPU) executes the packet analyzers to perform the security operations.

8. A system for deep packet inspection, said system comprising:
- at least one memory associated with at least one server, the at least one memory storing a deep packet inspection module;
- at least one virtual network interface controller (VNIC); and
- at least one processor programmed to execute the deep packet inspection to:
  - receive a copy of a network data packet received from the VNIC, by a packet analyzer in a plurality of packet analyzers;
  - perform one or more security operations on the received copy of the network data packet by the packet analyzer in parallel with at least one other packet analyzer in the plurality of packet analyzers, the at least one other packet analyzer performing a different security operation;
  - generate, by the packet analyzer and the at least one other packet analyzer module, recommendations for the network data packet, each of the recommendations comprising an allow recommendation or a deny recommendation; and
  - outputting the recommendations to control logic, the control logic instructing the VNIC to allow the network data packet or to discard the network data packet based on the recommendations.

9. The system of claim 8 wherein the VNIC routes the network data packet to a destination in response to a determination that the instruction is an allow instruction, and wherein the VNIC discards the network data packet in response to a determination the instruction is a discard instruction.

10. The system of claim 8, further comprising an operating system kernel, wherein the packet analyzers are loaded onto the kernel.

11. The system of claim 8, further comprising a management server, the management server comprising a virtual network manager, wherein the virtual network manager implements the plurality of packet analyzers and a plurality of control virtual machines (VMs) corresponding thereto.

12. The system of claim 8, further comprising at least one graphical processing unit (GPU), wherein the at least one GPU executes the plurality of packet analyzers.

13. The system of claim 8, further comprising a plurality of channels, wherein each of the packet analyzers is connected to a corresponding control VM via at least one channel in the plurality of channels.

14. The system of claim 8, further comprising a daemon connecting a given packet analyzer to a corresponding control VM, wherein configuration data associated with a change to the control VM is sent to the corresponding packet analyzer via the daemon.

15. One or more non-transitory computer storage media embodying computer-executable components, said components comprising:
- a plurality of packet analyzers that are executed to cause at least one processor to:
  - receive copies of a mirrored network data packet from a virtual network interface (VNIC);
  - perform security operations on the received copies of the mirrored network data packet by each of the packet analyzers in parallel;
  - generate recommendations, by the packet analyzers, for the network data packet, each of the recommendations comprising an allow recommendation or a deny recommendation; and
- output the recommendations to a buffer, wherein the VNIC routes the network data packet to a destination or discards the network data packet based on the recommendations in the buffer.

16. The non-transitory computer storage media of claim 15, further comprising a control logic component that is executed to instruct the VNIC to discard the network data packet if at least one of the recommendations in the buffer is a deny recommendation.

17. The non-transitory computer storage media of claim 16, wherein the control logic component instructs the VNIC to route the network data packet if all the recommendations output in the buffer are allow recommendations.

18. The non-transitory computer storage media of claim 15, further comprising a virtual network manager component that is executed by the at least one processor to implement the plurality of packet analyzers and a corresponding plurality of control VMs.

19. The non-transitory computer storage media of claim 18, wherein each packet analyzer is connected to the corresponding control VM via a dedicated channel.

20. The non-transitory computer storage media of claim 18, further comprising a daemon that is executed by the at least one processor to send configuration data associated with a change to one of the control VMs to a corresponding packet analyzer.

* * * * *